US008731364B2

(12) United States Patent
Murano et al.

(10) Patent No.: US 8,731,364 B2
(45) Date of Patent: May 20, 2014

(54) BREAKOUT ASSEMBLIES AND ASSOCIATED MOUNTING MEMBERS FOR FIBER OPTIC APPLICATIONS

(75) Inventors: Adam Murano, Lebanon, CT (US); Chester H. Rynaski, Franklin, CT (US)

(73) Assignee: Ortronics, Inc., New London, CT (US)

( * ) Notice: Subject to any disclaimer, the term of this patent is extended or adjusted under 35 U.S.C. 154(b) by 216 days.

(21) Appl. No.: 13/301,034

(22) Filed: Nov. 21, 2011

(65) Prior Publication Data

US 2013/0129296 A1  May 23, 2013

(51) Int. Cl.
G02B 6/00 (2006.01)

(52) U.S. Cl.
USPC ............ 385/136; 385/134; 385/135; 385/137

(58) Field of Classification Search
USPC .................................................. 385/134–137
See application file for complete search history.

(56) References Cited

U.S. PATENT DOCUMENTS

| | | | |
|---|---|---|---|
| 6,738,555 B1 | 5/2004 | Cooke et al. | |
| 7,330,629 B2 * | 2/2008 | Cooke et al. | 385/136 |
| 7,489,849 B2 * | 2/2009 | Reagan et al. | 385/135 |
| 7,627,222 B2 * | 12/2009 | Reagan et al. | 385/135 |
| 7,680,388 B2 * | 3/2010 | Reagan et al. | 385/139 |
| 7,805,044 B2 * | 9/2010 | Reagan et al. | 385/135 |
| 7,903,925 B2 | 3/2011 | Cooke et al. | |
| 7,945,135 B2 | 5/2011 | Cooke et al. | |
| 8,135,257 B2 | 3/2012 | Cooke et al. | |
| 8,184,938 B2 | 5/2012 | Cooke et al. | |
| 2006/0088250 A1 * | 4/2006 | Pimpinella et al. | 385/78 |
| 2006/0093303 A1 * | 5/2006 | Reagan et al. | 385/135 |
| 2006/0153517 A1 * | 7/2006 | Reagan et al. | 385/135 |
| 2008/0138025 A1 * | 6/2008 | Reagan et al. | 385/135 |
| 2009/0148120 A1 * | 6/2009 | Reagan et al. | 385/135 |
| 2010/0051886 A1 | 3/2010 | Cooke et al. | |
| 2010/0052346 A1 | 3/2010 | Cooke et al. | |
| 2010/0054682 A1 | 3/2010 | Cooke et al. | |
| 2010/0054684 A1 | 3/2010 | Cooke et al. | |
| 2010/0086267 A1 | 4/2010 | Cooke et al. | |
| 2010/0183270 A1 | 7/2010 | Davis et al. | |
| 2010/0202740 A1 | 8/2010 | Barlowe et al. | |
| 2010/0284662 A1 * | 11/2010 | Reagan et al. | 385/135 |
| 2013/0129296 A1 * | 5/2013 | Murano et al. | 385/135 |

OTHER PUBLICATIONS

Clip Plate for Installing RJ Furcation Plugs into a Pretium 4U Closet Connector Housing, Standard Recommended Procedure 003-712, Corning Cable Systems, Issue 1, Aug. 2006, available at http://catalog2.corning.com/CorningCableSystems/media/Resource_Documents/SRPs_rl/003-712.pdf.

(Continued)

Primary Examiner — Rhonda Peace
(74) Attorney, Agent, or Firm — McCarter & English, LLP

(57) ABSTRACT

Advantageous breakout assemblies and associated mounting members for use in fiber optic applications are provided. More particularly, the present disclosure provides for improved fiber optic breakout assemblies and associated mounting members (e.g., mounting panels) that include mating features. The present disclosure provides for improved systems/designs for breakout assemblies and mounting members for use in fiber optic applications, and wherein the breakout assemblies and mounting members are cost-effective, efficient and/or user-friendly. Improved, convenient, low-cost and effective systems, assemblies and methods are provided for easily breaking/branching out one or more fiber optic cables/fibers from a bundle or harness containing a plurality of fiber optic cables/fibers by utilizing advantageous breakout assemblies and mounting members that include mating features, and related assemblies.

23 Claims, 16 Drawing Sheets

(56) References Cited

OTHER PUBLICATIONS

Pretium Connector Closet Housing Hardware (PCH-M3-01U), Standard Recommended Procedure 003-719, Corning Cable Systems, Issue 1, Jun. 2006, available at http://catalog2.corning.com/CorningCableSystems/media/Resource_Documents/SRPs_rl/003-719.pdf.

LANscape Pretium Solutions, Plug & Play Systems U-Clip Strain Relief and Accessory Brackets, Part Number Reference Sheet, LAN-1071-EN, Corning Cable Systems, Nov. 2008, available at http://catalog2.corning.com/CorningCableSystems/media/Resource_Documents/additional_information_rl/LAN-1071-EN.pdf.

LANscape Pretium Solutions, Specification Sheet LAN-1141-EN, Corning Cable Systems, Mar. 2011, available at http://catalog2.corning.com/CorningCableSystems/media/NAFTA/Spec_Sheet/LAN-1141-EN.pdf.

Pretium® Evolved-Density Growth-Enabled (EDGE) Solution, Issue 4, Jan. 2010, available at.

Pretium EDGE HD Solutions for Enterprise Data Centers and Storage Area Networks, Specification Sheet LAN-1141-EN, Jul. 2012, available at http://csmedia.corning.com/CableSystems/Resource_Documents/product_family_specifications_rl/LAN-1141-EN.pdf.

\* cited by examiner

BREAKOUT ASSEMBLIES AND ASSOCIATED MOUNTING MEMBERS FOR FIBER OPTIC APPLICATIONS

BACKGROUND

1. Technical Field

The present disclosure generally relates to breakout assemblies and associated mounting members for use in fiber optic applications and, more particularly, to fiber optic breakout assemblies and associated mounting members (e.g., mounting panels) that include mating features.

2. Background Art

In general, many data transfer media includes multiple lines (e.g., multiple pairs of lines/fibers) bundled together. Communications systems typically incorporate many such media (e.g., fiber optic cables, etc.) for data transfer. Fiber optic cables typically include optical fibers that provide a transmission path for light energy.

For example, systems having a bundle or harness containing a plurality of fiber optic cables/fibers are known. In general, breakouts or breakout regions from the bundle or harness may be provided, with one or more of the fiber optic cables/fibers in the bundle or harness branching or breaking out for connection to a particular component in the system/network.

Current practice provides that conventional breakouts and/or breakout regions and their associated mounting assemblies are cumbersome, complex and/or inefficient. For example, one conventional breakout or breakout region includes a tube or the like that is shrink-sleeved over the breakout region, and which provides no mechanical mounting means (e.g., to the rack, cabinet, etc.). Other conventional efforts provide panels or brackets for planar applications, but such conventional efforts are typically very limited in their applications and also may be cumbersome, complex and/or inefficient in their applicability.

Thus, despite efforts to date, a need remains for improved systems/designs for breakout assemblies and associated mounting members for use in fiber optic applications that are cost-effective, efficient and/or user-friendly. These and other inefficiencies and opportunities for improvement are addressed and/or overcome by the systems, assemblies and methods of the present disclosure.

SUMMARY

The present disclosure provides for improved breakout assemblies and associated mounting members for use in fiber optic applications. More particularly, the present disclosure provides for advantageous fiber optic breakout assemblies and associated mounting members (e.g., mounting panels) that include advantageous mating features. In general, the present disclosure provides for improved systems/designs for breakout assemblies and associated mounting members for use in fiber optic applications, and wherein the breakout assemblies and mounting members are cost-effective, efficient and/or user-friendly. In exemplary embodiments, the present disclosure provides for improved, convenient, low-cost and effective systems and methods for easily breaking/branching out one or more fiber optic cables/fibers from a bundle or harness containing a plurality of fiber optic cables/fibers by utilizing advantageous breakout assemblies and mounting members that include mating features, and related assemblies.

The present disclosure provides for a breakout assembly for use in fiber optic applications including a housing having a first end and a second end, the housing including a mating member, the mating member including a post member and a securing member; wherein the housing is configured to house at least a portion of a fiber optic breakout region; wherein the post member extends from the housing and the securing member extends past at least one side of the post member to define the mating member; and wherein at least a portion of the securing member is configured and dimensioned to be releasably secured to a mounting member.

The present disclosure also provides for a breakout assembly for use in fiber optic applications wherein the first end of the housing is configured and adapted to house at least a portion of a cable or harness containing a plurality of fiber optic cables or fibers; and wherein the second end is configured and adapted to house at least a portion of two fiber optic cables or fibers. The present disclosure also provides for a breakout assembly for use in fiber optic applications wherein the cable or harness is a jacketed multiple fiber cable and the two fiber optic cables or fibers are jacketed single or multiple fiber cables. The present disclosure also provides for a breakout assembly for use in fiber optic applications wherein the second end is configured and adapted to house at least a portion of six fiber optic cables or fibers; and wherein the cable or harness is a jacketed twelve-fiber cable and the six fiber optic cables or fibers are jacketed two-fiber cables.

The present disclosure also provides for a breakout assembly for use in fiber optic applications wherein the second end is configured and adapted to house at least a portion of twelve fiber optic cables or fibers; and wherein the cable or harness is a jacketed twelve-fiber cable and the twelve fiber optic cables or fibers are jacketed single-fiber cables. The present disclosure also provides for a breakout assembly for use in fiber optic applications wherein the housing is defined by first and second housing structures; and wherein the first and second housing structures are latched with respect to each other to define the housing. The present disclosure also provides for a breakout assembly for use in fiber optic applications wherein the mating member is integrally formed from the housing.

The present disclosure also provides for a breakout assembly for use in fiber optic applications wherein the mounting member includes at least one slot having a first portion wider than a second portion, the first portion configured and dimensioned to allow the securing member of the mating member to pass through the first portion of the slot; and wherein the second portion is configured and dimensioned to releasably secure the mating member to the mounting member after the housing has moved towards the second portion of the slot once the securing member of the mating member has passed through the first portion of the slot.

The present disclosure also provides for a breakout assembly for use in fiber optic applications wherein the cable or harness is a fiber optic cable harness that includes multiple cable segments secured in a bundle. The present disclosure also provides for a breakout assembly for use in fiber optic applications wherein the housing is molded or over-molded around or over at least a portion of a fiber optic breakout region. The present disclosure also provides for a breakout assembly for use in fiber optic applications wherein the fiber optic breakout region is pre-molded before the housing is housed over the fiber optic breakout region.

The present disclosure also provides for a breakout assembly for use in fiber optic applications wherein at least one material utilized during the pre-molding process bonds or secures strength members from each of the two fiber optic cables or fibers together at or near the breakout region to strength members of the cable or harness. The present disclosure also provides for a breakout assembly for use in fiber optic applications wherein the housing is an overmolded housing. The present disclosure also provides for a breakout assembly for use in fiber optic applications wherein the mounting member with the releasably secured mating member is mounted with respect to or utilized in conjunction with equipment selected from the group consisting of a cable tray, vertical wire manager, rack mount enclosure, overhead cable pathway rack, floor box, multimedia workstation outlet, wall mount enclosure or cabinet, cabinet, rack and zero-U application.

The present disclosure also provides for a breakout assembly for use in fiber optic applications wherein the mounting member includes at least one attachment member that is configured and dimensioned to attach or mount with respect to wires or equipment. The present disclosure also provides for a breakout assembly for use in fiber optic applications wherein the mounting member includes at least one through hole component that defines a through hole and is configured and dimensioned to allow the mounting member to be mounted to a surface. The present disclosure also provides for a breakout assembly for use in fiber optic applications wherein the securing member extends past both sides of the post member to define a substantially T-shaped mating member.

The present disclosure also provides for a breakout assembly for use in fiber optic applications wherein the securing member extends radially past the outer sides of the post member. The present disclosure also provides for a breakout assembly for use in fiber optic applications wherein the securing member extends past at least one side of the post member to define a substantially L-shaped mating member.

The present disclosure also provides for a method for attaching a breakout assembly to a mounting member including providing a housing having a first end and a second end, the housing: (i) configured to house at least a portion of a fiber optic breakout region and (ii) including a mating member, the mating member including a post member and a securing member, with the post member extending from the housing and the securing member extending past at least one side of the post member to define the mating member; and releasably securing the mating member to a mounting member.

The present disclosure also provides for a method for attaching a breakout assembly to a mounting member wherein the first end of the housing is configured and adapted to house at least a portion of a cable or harness containing a plurality of fiber optic cables or fibers; and wherein the second end is configured and adapted to house at least a portion of two fiber optic cables or fibers. The present disclosure also provides for a method for attaching a breakout assembly to a mounting member wherein the mounting member includes at least one slot having a first portion wider than a second portion, the first portion configured and dimensioned to allow the securing member of the mating member to pass through the first portion of the slot; and wherein the second portion is configured and dimensioned to releasably secure the mating member to the mounting member after the housing has moved towards the second portion of the slot once the securing member of the mating member has passed through the first portion of the slot.

The present disclosure also provides for, in combination, a fiber optic breakout assembly that includes a housing having a first end and a second end, the housing: (i) configured to house at least a portion of a fiber optic breakout region and (ii) including a mating member, the mating member including a post member and a securing member, with the post member extending from the housing and the securing member extending past at least one side of the post member to define the mating member; a mounting member that includes at least one slot having a first portion wider than a second portion, the first portion configured and dimensioned to allow the securing member of the mating member to pass through the first portion of the slot; wherein the first end of the housing is configured and adapted to house at least a portion of a cable or harness containing a plurality of fiber optic cables or fibers; wherein the second end is configured and adapted to house at least a portion of two fiber optic cables or fibers; and wherein the second portion of the at least one slot is configured and dimensioned to releasably secure the mating member to the mounting member after the housing has moved towards the second portion of the slot once the securing member of the mating member has passed through the first portion of the slot.

Additional advantageous features, functions and applications of the disclosed, systems, assemblies and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems, assemblies and methods, reference is made to the appended figures, wherein.

DETAILED DESCRIPTION

Figure 1:
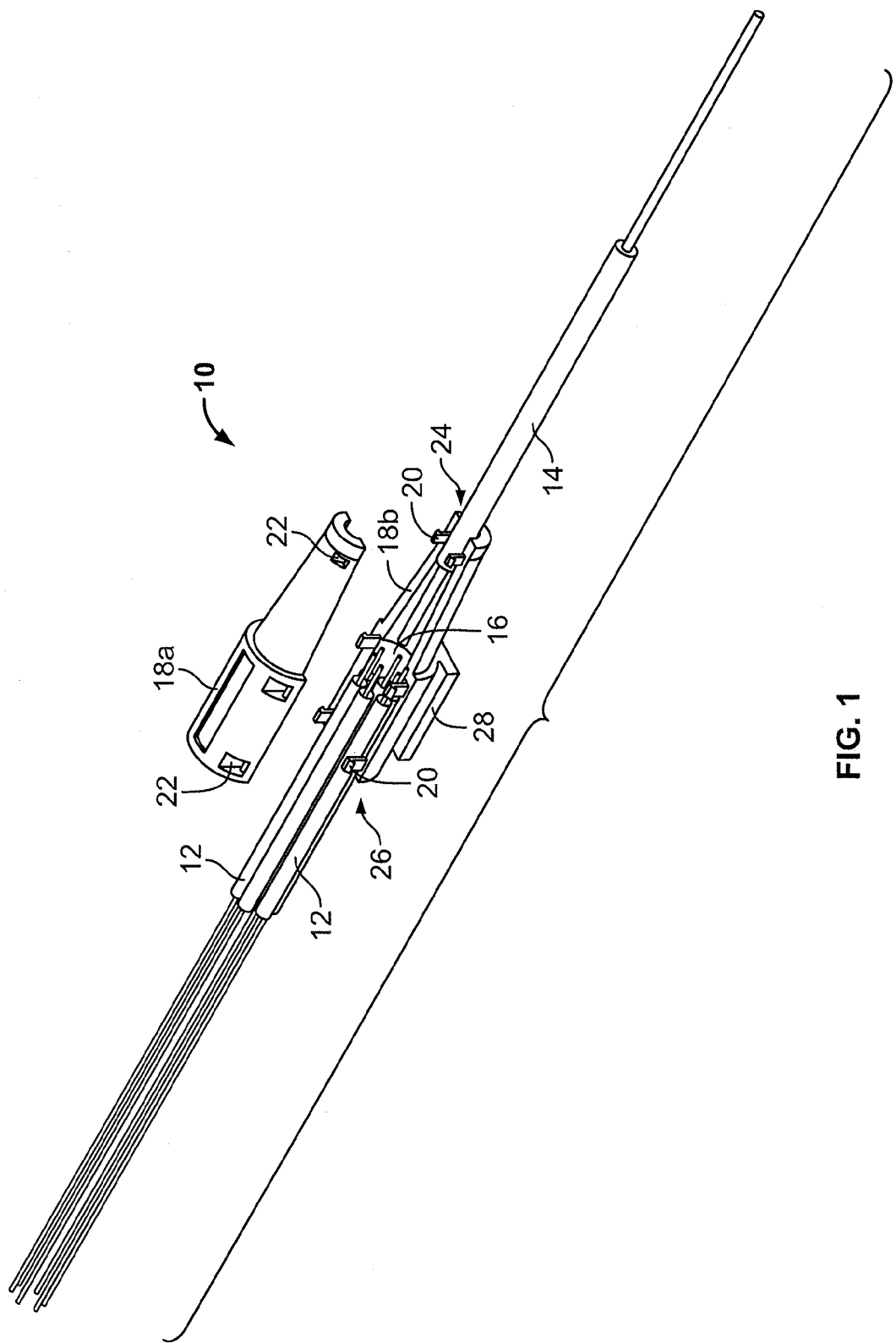
FIG. 1 is a side perspective view of a breakout assembly in accordance with an exemplary embodiment of the present disclosure, prior to assembly of the breakout housing.
Figure 2:
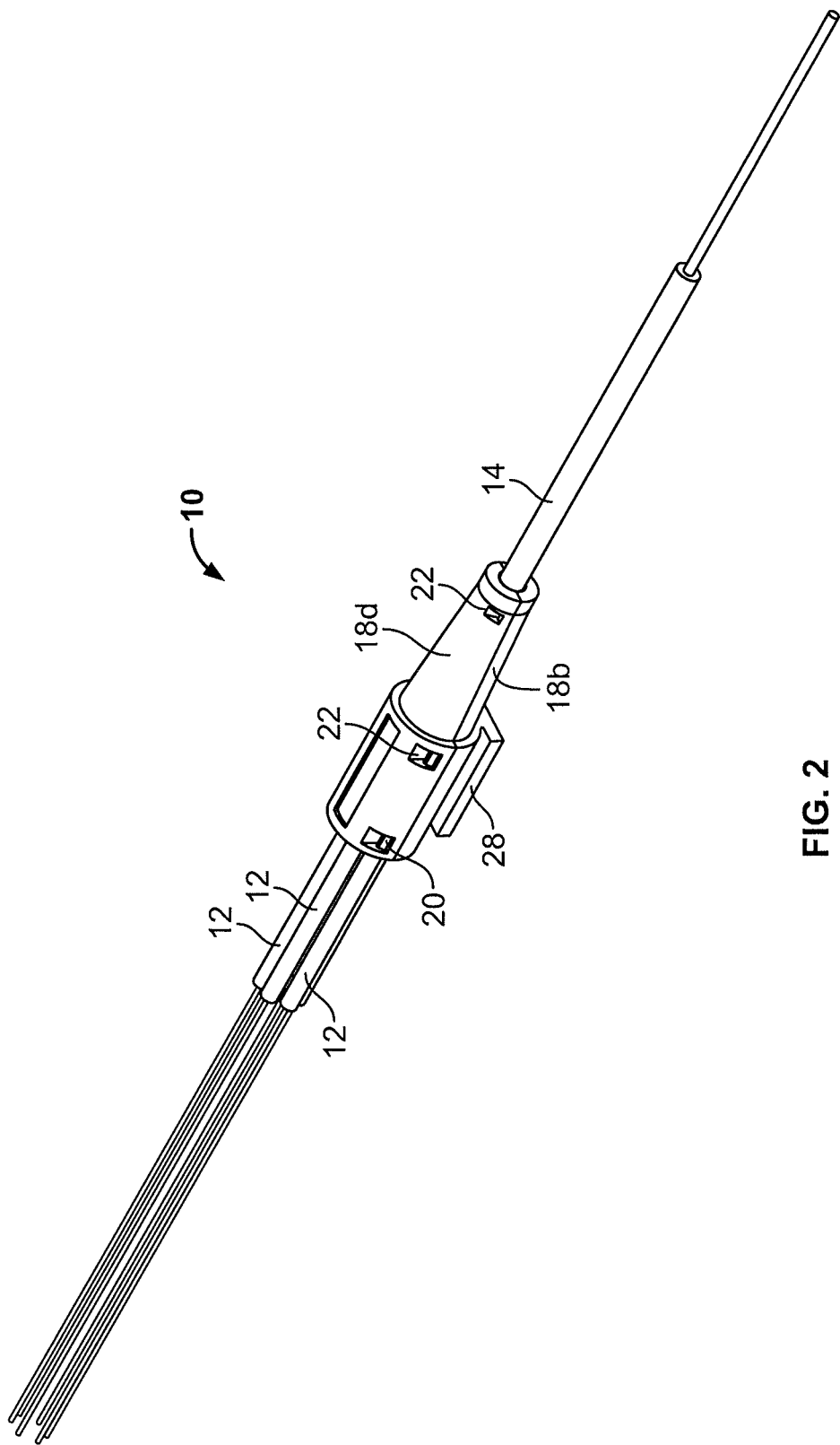
FIG. 2 is a side perspective view of the assembly of FIG. 1, after assembly of the housing.
Figure 3:
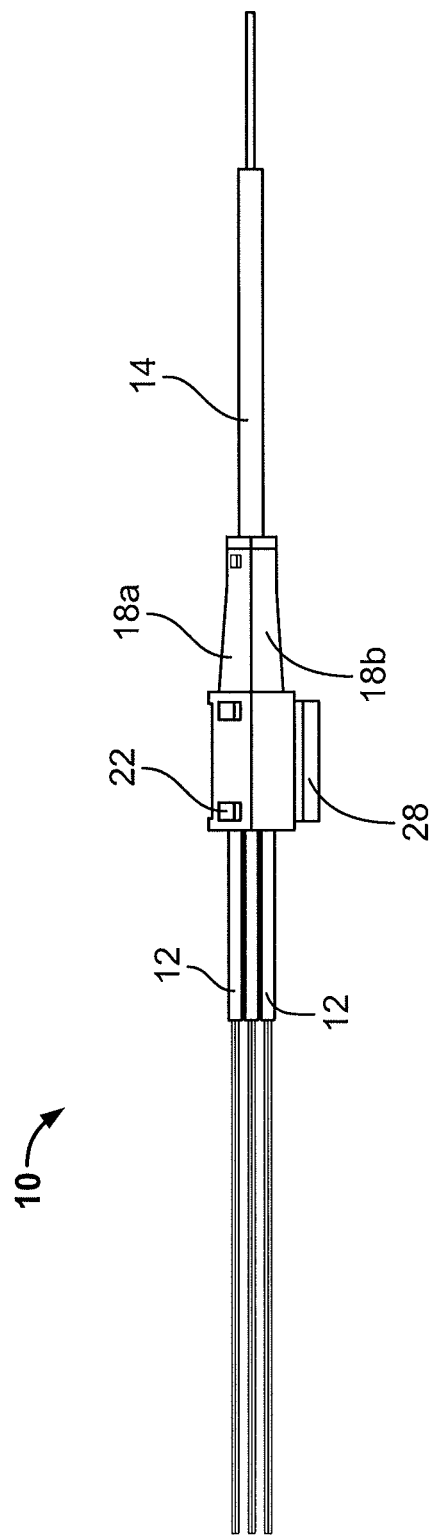
FIG. 3 is a side view of the breakout assembly of FIG. 2.
Figure 4:
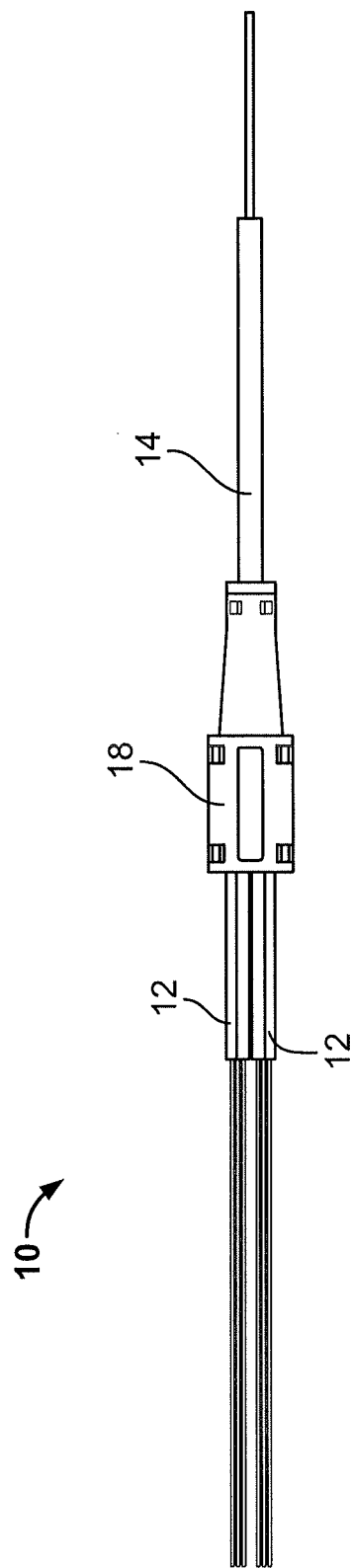
FIG. 4 is a top view of the breakout assembly of FIG. 2.
Figure 5:
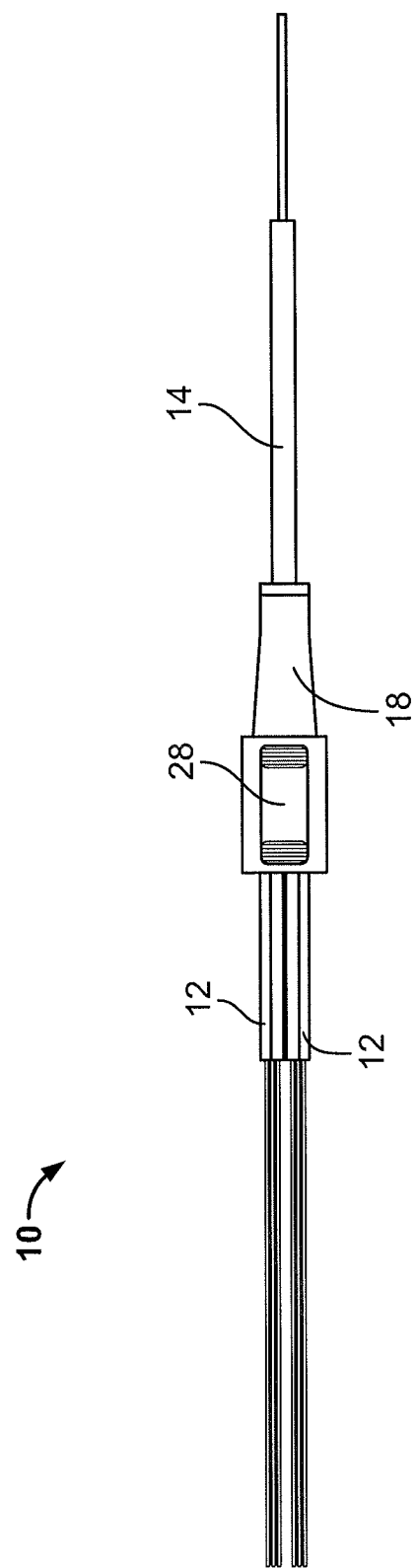
FIG. 5 is a bottom view of the breakout assembly of FIG. 2.

In the description which follows, like parts are marked throughout the specification and drawings with the same reference numerals, respectively. Drawing figures are not necessarily to scale and in certain views, parts may have been exaggerated for purposes of clarity.

In general, advantageous breakout assemblies and associated mounting members for use in fiber optic applications are provided. More particularly, the present disclosure provides for improved fiber optic breakout assemblies and associated mounting members (e.g., mounting panels) that include mating features. For example, the present disclosure provides for improved systems/designs for breakout assemblies and mounting members for use in fiber optic applications, and wherein the breakout assemblies and mounting members are cost-effective, efficient and/or user-friendly. Stated another way, the present disclosure provides for improved, convenient, low-cost and effective systems and methods for easily breaking/branching out one or more fiber optic cables/fibers from a bundle or harness containing a plurality of fiber optic cables/fibers by utilizing advantageous breakout assemblies and mounting members that include mating features, and related assemblies (e.g., grouping breakout assemblies on an associated mounting member).

In general, current practice provides that breakouts and/or breakout regions and their associated mounting assemblies are cumbersome, complex and/or inefficient. For example, one typical breakout assembly or breakout region includes a tube or the like that is shrink-sleeved over the breakout region, but provides no mechanical mounting means for the breakout region/assembly (e.g., to the rack, cabinet, etc.). Additionally, other efforts provide panels or brackets for planar applications or the like, but such efforts are very limited in their applicable uses and also may be cumbersome, complex and/or inefficient. In exemplary embodiments, the present disclosure provides for improved, convenient, low-cost and effective systems and methods for easily breaking/branching out one or more fiber optic cables/fibers from a bundle or harness containing a plurality of fiber optic cables/fibers by utilizing advantageous breakout assemblies and mounting members that include mating features, thereby providing a significant manufacturing and commercial advantage as a result.

Referring now to the drawings, there is illustrated an exemplary breakout assembly 10 for use in fiber optic applications. In exemplary embodiments, breakout assembly 10 is configured and dimensioned to break/branch out one or more fiber optic cables/fibers 12 from a bundle, cable or harness 14 containing a plurality of fiber optic cables/fibers. In one embodiment, breakout assembly 10 provides a multiple fiber MPO-style connection to paired single fiber connections 12 through a breakout region/area 16, as discussed further below.

In exemplary embodiments, bundle, cable or harness 14 is a jacketed multiple fiber cable, although the present disclosure is not limited thereto. For example, cable/bundle 14 may be a jacketed twelve-fiber cable or the like. However, it is noted that cable/bundle 14 may take a variety of forms (e.g., jacketed eight-fiber cable, jacketed twenty-four-fiber cable, etc.). Bundle/harness 14 may also take the form of a fiber optic cable harness which includes multiple cable segments secured in a bundle.

In exemplary embodiments, each cable/fiber 12 of the one or more fiber optic cables/fibers 12 is a jacketed single or multiple fiber cable 12. For example, cable 12 may be a jacketed two-fiber cable or the like. However, it is noted that each cable/fiber 12 may take a variety of forms (e.g., jacketed single-fiber cable, etc.). In one embodiment, breakout assembly 10 includes six individual and jacketed two-fiber cables 12 (e.g., when cable/bundle 14 is a jacketed twelve-fiber cable). Alternatively, breakout assembly 10 may include twelve individual and jacketed single-fiber cables 12 (e.g., when cable/bundle 14 is a jacketed twelve-fiber cable). Likewise, breakout assembly 10 may include twelve individual and jacketed two-fiber cables 12 (e.g., when cable/bundle 14 is a jacketed twenty-four-fiber cable), etc.

In general, fiber optic breakout assembly 10 includes a housing 18. In exemplary embodiments, housing 18 includes a top housing portion or member 18a and a bottom housing portion or member 18b. Housing 18 is typically configured and dimensioned to house, cover and/or define at least a portion of fiber optic breakout region/area 16. Top housing member 18a is generally configured and adapted to attach, secure and or mount with respect to bottom housing member 18b to substantially cover or house breakout region/area 16. In exemplary embodiments, housing 18 takes the form of a clamshell housing or the like.

For example and as depicted in FIG. 1, top housing member 18a and bottom housing member 18b are adapted to latch or snap-fit together, e.g., by latching members 20 extending from the top surface of bottom housing member 18b. Such latching or snap-fit members 20 detachably engage mating slots or grooves 22 formed in top housing member 18a. Stated another way, top housing member 18a may releasably snap-fit together with and/or mount with respect to bottom housing member 18b. In an alternative embodiment, housing 18 may be molded or over-molded around and/or over breakout region/area 16.

In general and as shown in FIG. 1, first end 24 of housing 18 is configured to receive and/or house at least a portion of bundle, cable or harness 14, and second end 26 of housing 18 is configured to receive and/or house at least a portion of the one or more fiber optic cables/fibers 12.

In exemplary embodiments, fiber optic breakout region/area 16 is pre-molded or the like before housing 18 is assembled, secured, or overmolded around and/or over breakout region/area 16. For example, prior to being covered or housed by: (i) an overmolded housing 18 or (ii) an assembled housing 18 (e.g., a snap-together housing), the fiber optic breakout region/area 16 may be pre-configured with a molding or pre-molding process. In general, such molding or pre-molding process produces a geometry or shape of molded/pre-molded breakout region/area 16 that is compatible with the interior of housing 18 (e.g., of the interior of clamshell or snap-together housing 18). In exemplary embodiments, at least one of the compounds, materials or substances utilized during the molding or pre-molding process subsequently bonds and/or secures the strength members or the like from each one or more fiber optic cables/fibers 12 (e.g., jacketed single or multiple fiber cable) together at or near the breakout region/area 16 to the strength members or the like of the bundle or cable 14 (e.g., jacketed multiple fiber cable). Such bonding and/or securing of the strength members of each one or more fiber optic cables/fibers 12 to the strength members of the bundle or cable 14 protects the individual fibers of assembly 10 from hazard/damage.

It has been found that by pre-configuring the breakout region/area/junction 16 in this way, the geometry of the housing 18 increases in flexibility to permit a range of breakout assembly 10 styles or shapes to be developed. For example, an overmolded housing 18 around and/or over breakout region/ area 16 conforms to the shape of the molded/pre-molded breakout region/area 16 as a result of the molding process of the housing 18. Additionally as noted above, such molding or pre-molding process may produce a geometry or shape of molded/pre-molded breakout region/area 16 that is compatible with the interior of non-overmolded housing 18 (e.g., snap-together housing 18 with top housing member 18*a* and bottom housing member 18*b*).

In general, housing 18 typically includes mating member 28. In one embodiment, the housing 18 (or bottom housing member 18*b*) and the mating member 28 are of unitary construction with respect to each other (e.g., the mating member 28 is integrally formed from the housing 18 or bottom housing member 18*b*), although the present disclosure is not limited thereto. Alternatively, mating member 28 may be separately fabricated and then secured, attached or mounted with respect to housing 18.

Figure 14:
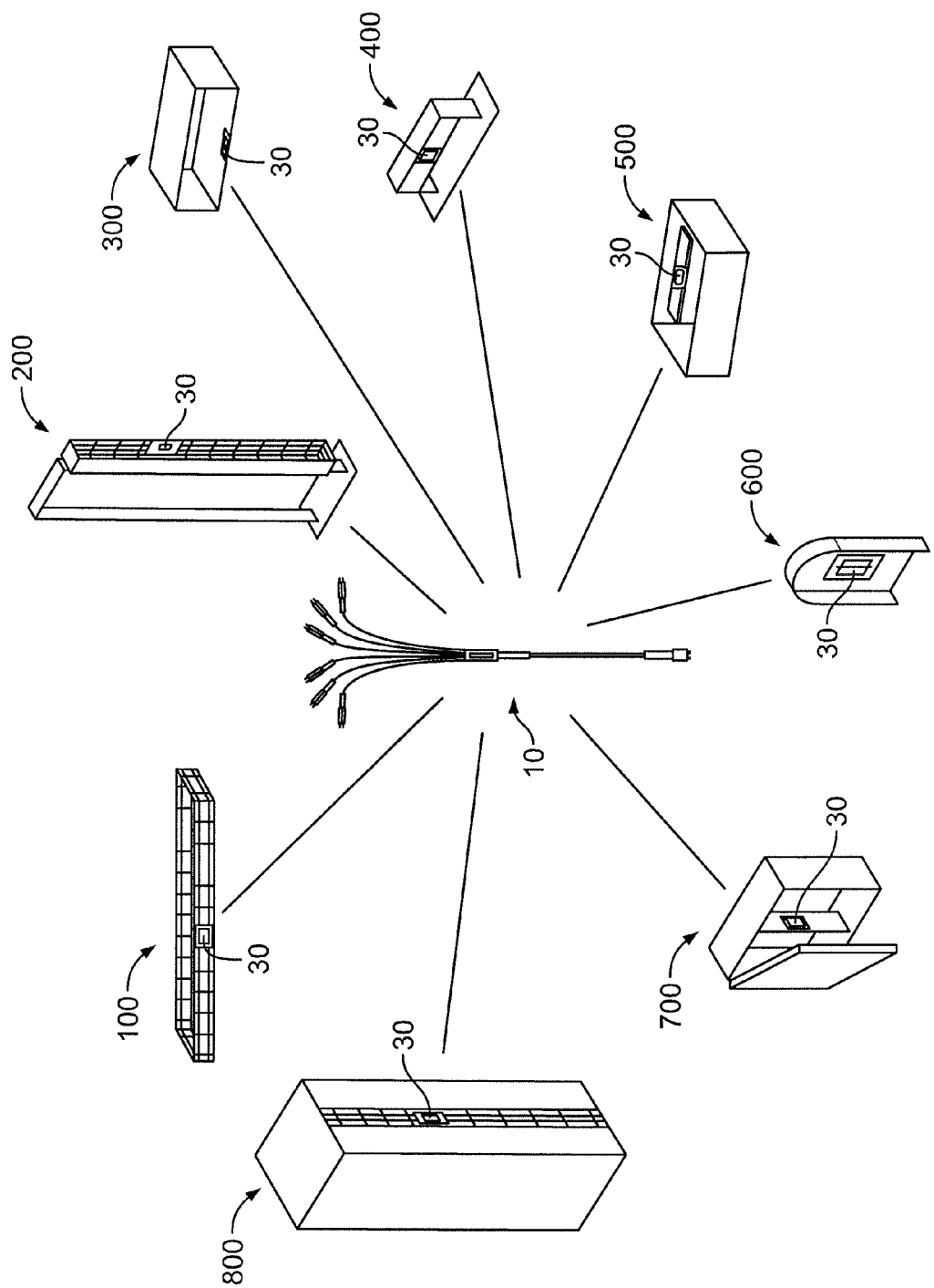
FIGS. 14-15 depict various locations to mount a breakout assembly and associated mounting member in accordance with exemplary embodiments of the present disclosure.
Figure 15:
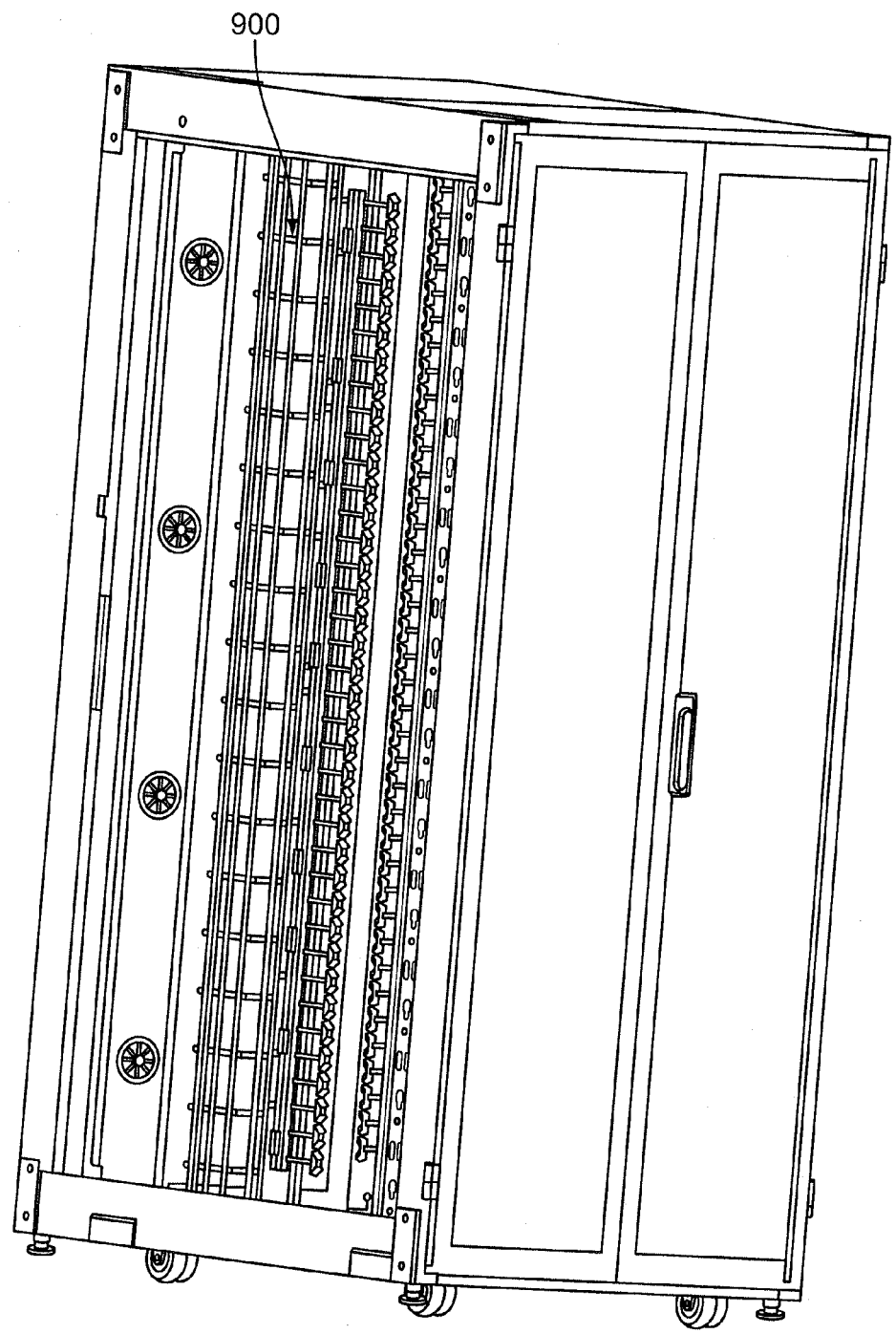

In general, mating member 28 is configured and dimensioned to be releasably secured or attached to a mounting member 30, as further discussed below in conjunction with FIGS. 7-13. As such, a user may then mount, attach, and/or secure the mounting member 30 to a desired position and/or location. For example and as depicted in FIGS. 14-15, mounting member 30 with attached/secured breakout assembly 10 may be mounted with respect to and/or utilized in conjunction with cable tray 100, vertical wire manager 200, rack mount enclosure 300, overhead cable pathway rack 400, floor box 500, multimedia workstation outlet (e.g., for fiber and copper) 600, wall mount enclosure or cabinet 700, cabinets 800, 900, racks or zero-U applications. Exemplary mounting member 30 takes the form of a rectangular or square, substantially planar mounting member or panel 30, although the present disclosure is not limited thereto. Rather, mounting member 30 may take a variety of forms.

In exemplary embodiments, mating member 28 is a substantially T-shaped or fin-shaped component or protrusion that extends from housing 18 (e.g., from bottom housing member 18*b*) to allow at least a portion of mating member 28 to releasably secure or attach to at least a portion of mounting member 30. In general, mating member 28 defines at least one mating feature that allows the breakout assembly 10 to releasably secure or mount with respect to mounting member 30.

Figure 6:
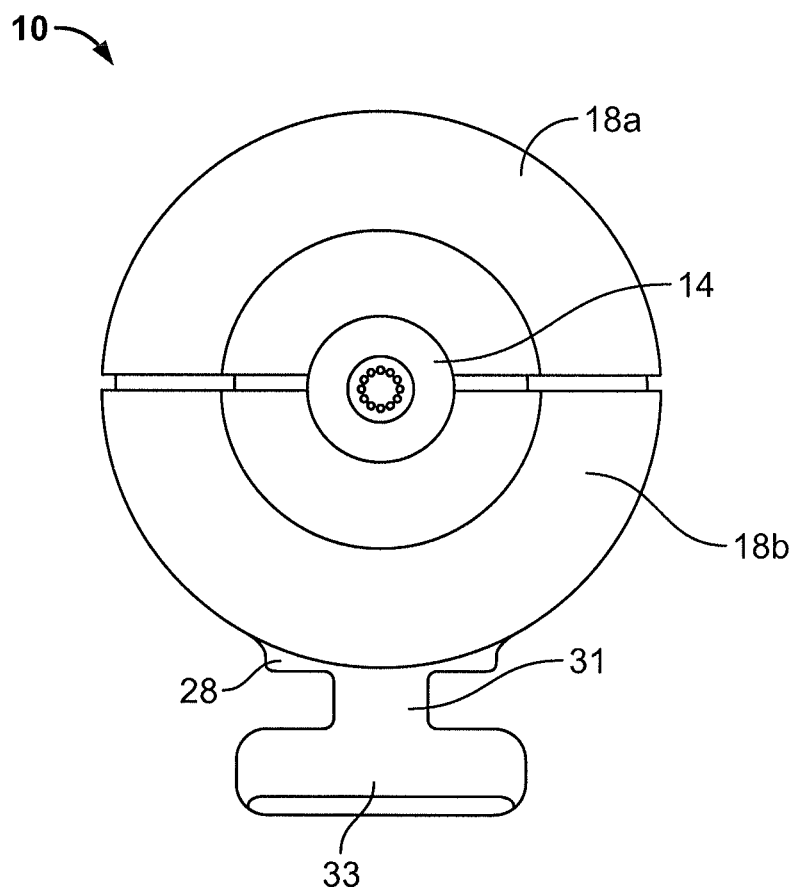
FIG. 6 is a rear view of the breakout assembly of FIG. 2.

In exemplary embodiments and as best shown in FIG. 6, mating member 28 includes a post member 31 that extends from housing 18 or 18*b*, and a securing member 33 that extends beyond or past both sides of the post member 31 to define a substantially T-shaped or fin-shaped component or protrusion (i.e., mating member 28) that extends from the housing 18 or 18*b* (e.g., extends from the bottom of housing 18). In general, post member 31 and securing member 33 are of unitary construction with respect to each other, although the present disclosure is not limited thereto. Post member 31 may also include an attachment member that is configured and dimensioned to be attached, secured or mounted with respect to housing 18 or 18*b* (e.g., with respect to a groove or slot of housing 18).

Figure 7:
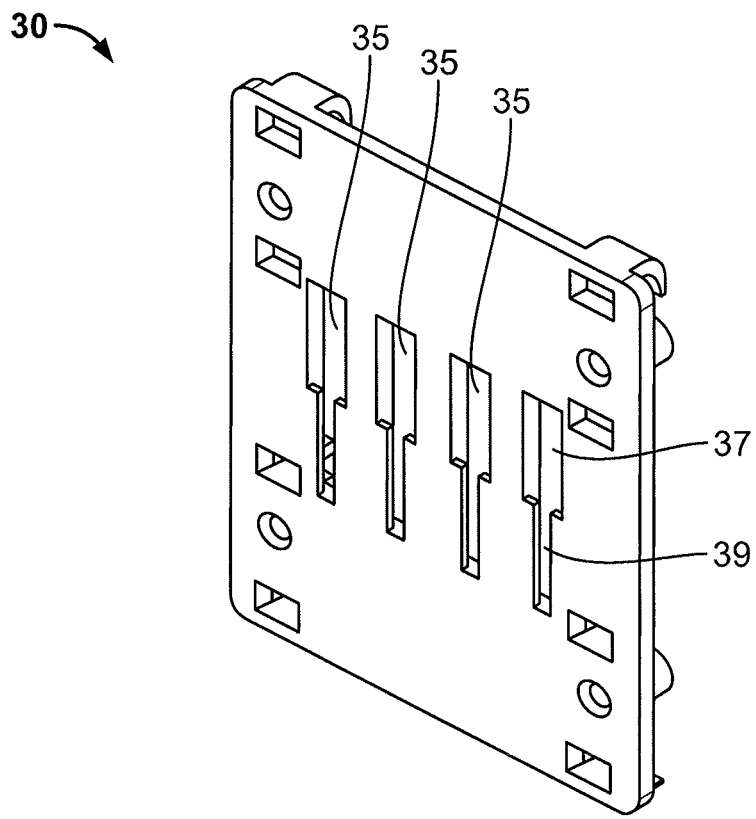
FIG. 7 is a perspective view of a mounting member in accordance with an exemplary embodiment of the present disclosure, prior to assembly of the breakout assembly.
Figure 8:
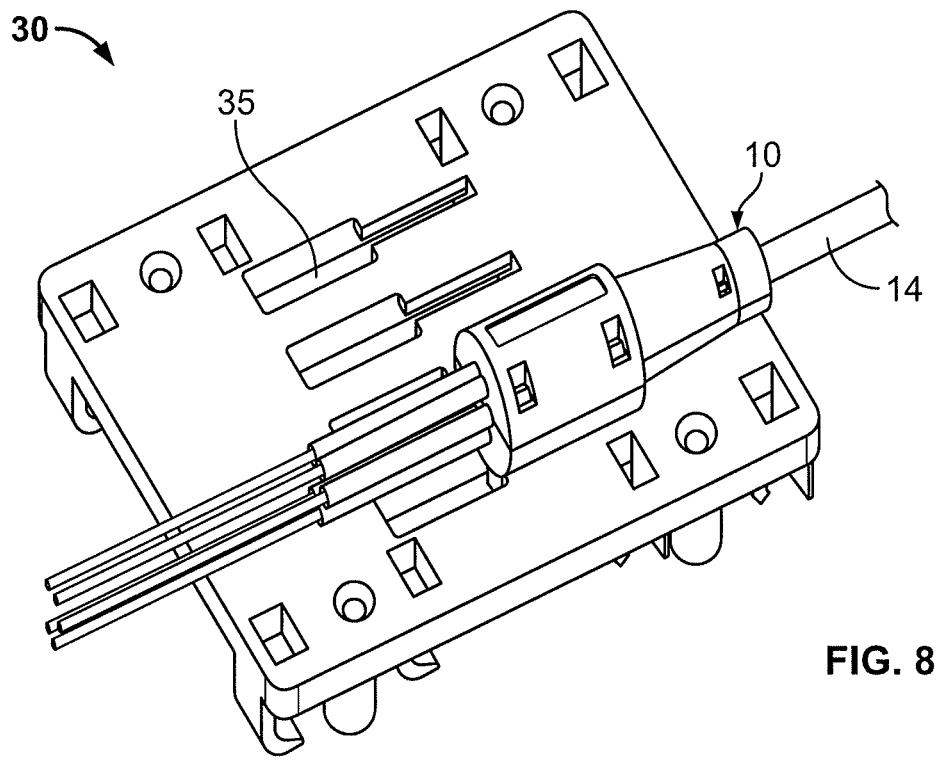
FIG. 8 is a top perspective view of the mounting member of FIG. 7, with the breakout assembly of FIG. 2 mounted thereon.
Figure 9:
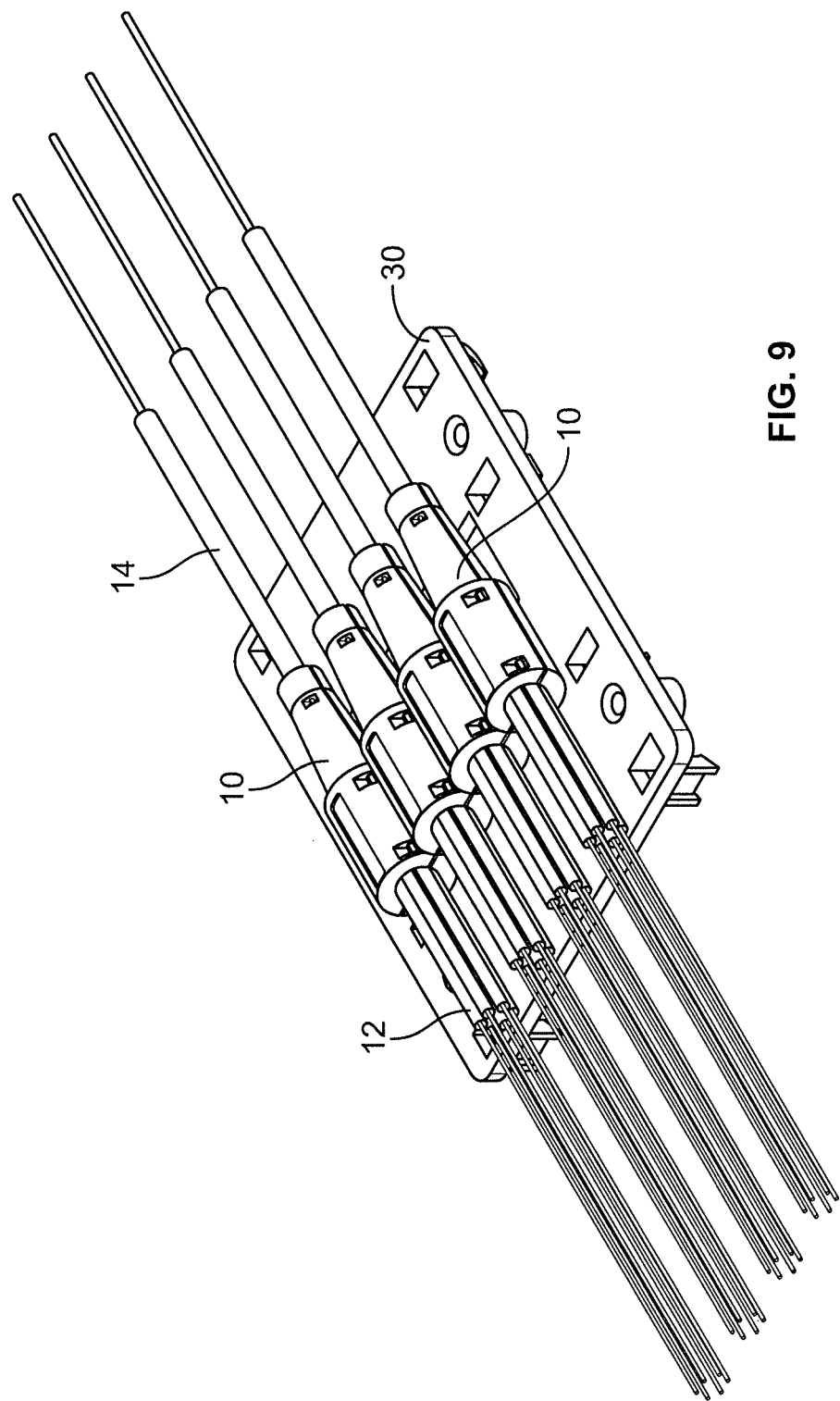
FIG. 9 is a side perspective view of the mounting member of FIG. 7, with a plurality of exemplary breakout assemblies mounted thereon.
Figure 10:
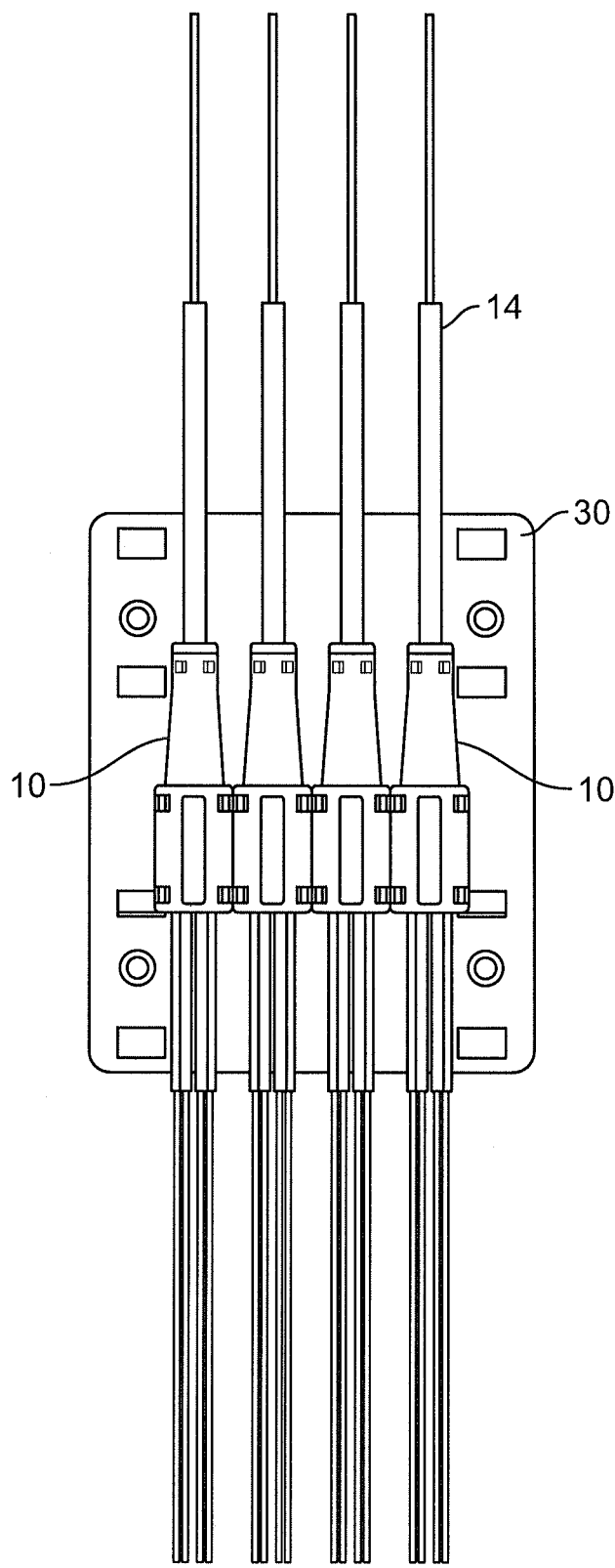
FIG. 10 is a top view of the mounting member of FIG. 9.

As noted above, mating member 28 of assembly 10 typically is configured and dimensioned to be releasably secured or attached to mounting member 30. In general, mounting member 30 includes at least one mating slot, opening or groove 35. In exemplary embodiments and as shown in FIGS. 7-8, mounting member 30 includes four slots, openings or grooves 35. Each slot 35 is typically configured and dimensioned to receive and releasably secure/attach one breakout assembly 10 to mounting member 30.

For example, slot 35 typically includes a first portion 37 that is wider than a second portion 39. In exemplary embodiments, first portion 37 of slot 35 is configured and adapted to receive and/or allow the securing member 33 of the mating member 28 to pass through the opening defined by first portion 37 of slot 35. Once the securing member 33 has passed through first portion 37 of slot 35, a user may then move or slide the breakout assembly towards the second portion 39 of slot 35 to thereby releasably and/or lockingly secure the securing member 33 to mounting member 30. Stated another way, securing member 33 is releasably secured or attached to mounting member 30 by passing the securing member 33 through the wider portion 37 and then moving the breakout assembly 10 towards the narrower portion 39 to lockingly engage at least a portion of securing member 33 underneath and/or behind at least a portion of mounting member 30 (e.g., like a sliding dovetail joint). Such approach prevents or substantially eliminates an unintended disassembly of breakout assembly 10 from mounting member 30. In general, breakout assembly 10 may be unsecured or detached from mounting member 30 by moving the assembly 10 towards the first portion 37 and passing the securing member 33 through the opening defined by first portion 37.

In an alternative embodiment, breakout assembly 10 and/or mounting member 30 may include latching members or snap features/members or the like to allow the breakout assembly 10 and mounting member 30 to latch or snap-fit together e.g., by latching members extending from the bottom housing member 18*b* and/or from the top surface of mounting member 30. Such latching or snap-fit members would detachably engage mating slots or grooves formed in mounting member 30 and/or bottom housing member 18*b*.

Figure 16:
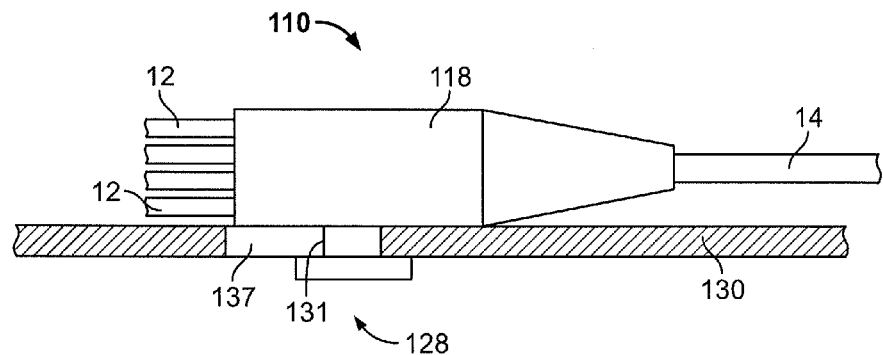
FIG. 16 is a side view of a breakout assembly mounted with respect to a mounting member in accordance with another exemplary embodiment of the present disclosure, with the mounting member shown in cross section.
Figure 17:
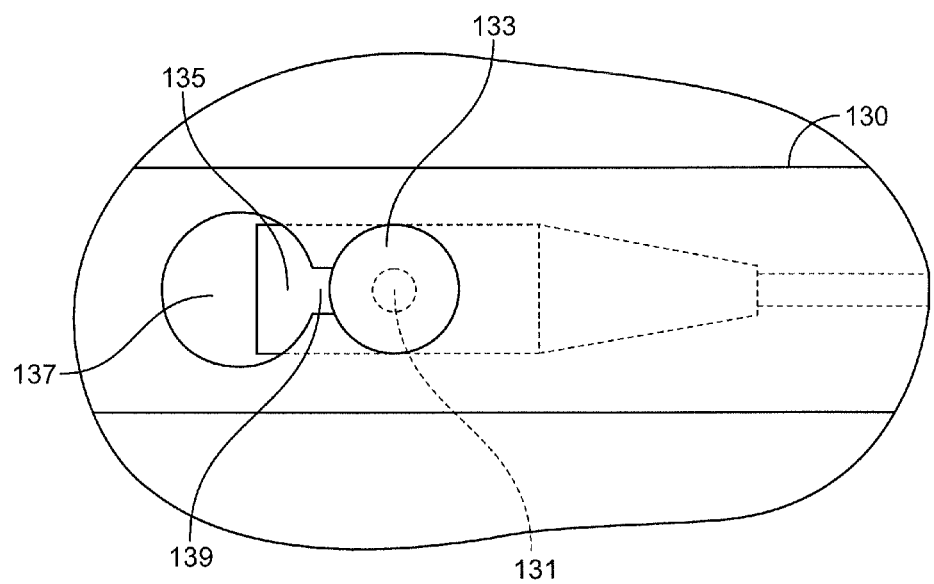
FIG. 17 is a partial bottom view of the breakout assembly and mounting member of FIG. 16.

In one alternative embodiment and as depicted in FIGS. 16-17, breakout assembly 110 and mounting member 130 for use in fiber optic applications are shown. Breakout assembly 110 and mounting member 130 may be structurally and functionally similar to the breakout assembly 10 and mounting member 30 discussed above, respectively, with some differences.

Similar to assembly 10, the breakout assembly 110 typically is configured and dimensioned to break/branch out one or more fiber optic cables/fibers 12 from a bundle, cable or harness 14 containing a plurality of fiber optic cables/fibers. Like assembly 10, the breakout assembly 110 includes a housing 118 (e.g., similar to housing 18).

As shown in FIGS. 16-17, housing 118 includes mating member 128. In general, mating member 128 is configured and dimensioned to be releasably secured or attached to mounting member 130. In exemplary embodiments of the present disclosure, mating member 128 is a component or protrusion that extends from housing 118 to allow at least a portion of mating member 128 to releasably secure to at least a portion of mounting member 130.

In one embodiment, mating member 128 includes a post member 131 that extends from housing 118, and a securing member 133 that extends (e.g., radially) beyond or past the outer sides of post member 131.

In general, mounting member 130 includes at least one mating slot, opening or groove 135. Slot 135 typically includes a first portion 137 that is larger/wider than second portion 139. First portion 137 is configured to receive and/or allow securing member 133 to pass through the opening defined by the first portion 137, and then a user may move or slide the assembly 110 towards the second portion 139 to thereby releasably and/or lockingly secure the securing member 133 to mounting member 130.

Figure 18:
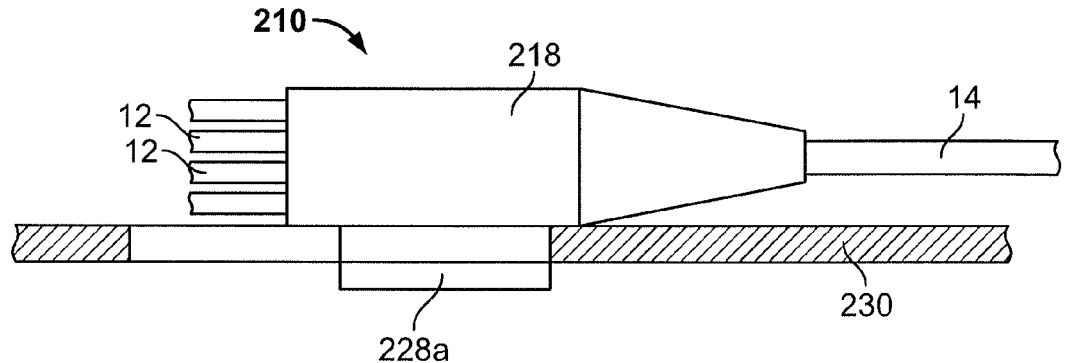
FIG. 18 is a side view of a breakout assembly mounted with respect to a mounting member in accordance with another exemplary embodiment of the present disclosure, with the mounting member shown in cross section.
Figure 19:
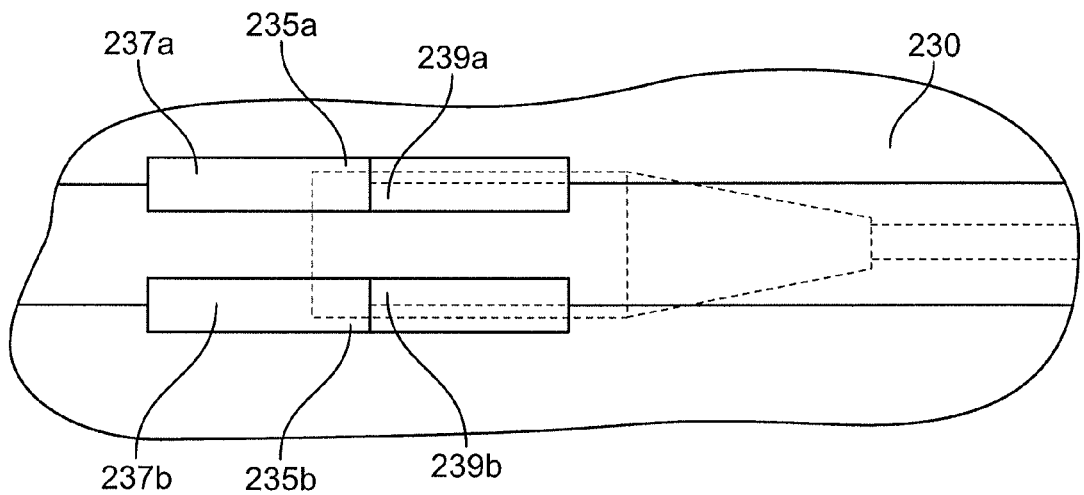
FIG. 19 is a partial bottom view of the breakout assembly and mounting member of FIG. 18.
Figure 20:
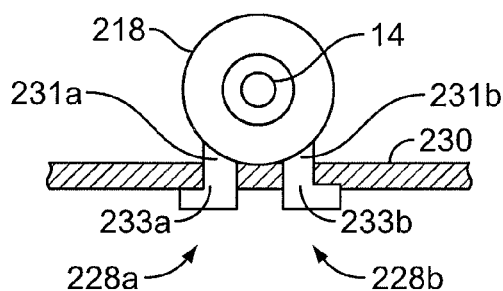
FIG. 20 is a rear view of the breakout assembly and mounting member of FIG. 18, with the mounting member shown in cross section.

In another alternative embodiment and as depicted in FIGS. 18-20, breakout assembly 210 and mounting member 230 for use in fiber optic applications are shown. Breakout assembly 210 and mounting member 230 may be structurally and functionally similar to the breakout assembly 10 and mounting member 30 discussed above, respectively, with some differences.

Similar to assembly 10 and 110, assembly 210 typically is configured and dimensioned to break/branch out one or more fiber optic cables/fibers 12 from a bundle 14 containing a plurality of cables/fibers. Like assembly 10, assembly 210 typically includes a housing 218.

As shown in FIGS. 18-20, housing 218 includes mating members 228a and 228b. In general, mating members 228a, 228b are configured and dimensioned to be releasably secured or attached to mounting member 230. In exemplary embodiments, each mating member 228a, 228b is a component or protrusion that extends from housing 218 to allow at least a portion of mating members 228a, 228b to releasably secure to at least a portion of mounting member 230.

In one embodiment, each mating member 228a, 228b includes a post member 231a, 231b, respectively, that extends from housing 218. A securing member 233a, 233b extends beyond or past at least one side of post member 231a, 231b, respectively, to define substantially L-shaped mating members 228a, 228b that extend from the bottom of housing 218.

Mounting member 230 typically includes slots/grooves 235a, 235b. Slots 235a, 235b include a first portion 237a, 237b that are larger/wider than second portions 239a, 239b, respectively. First portions 237a, 237b are configured to receive and/or allow securing members 233a, 233b to pass through the openings defined by first portions 237a, 237b, respectively. A user may then move or slide assembly 210 towards the second portions 239a, 239b to thereby releasably and/or lockingly secure the securing members 233a, 233b to mounting member 230.

Exemplary mounting member 30 (or member 130, or member 230) thus allows a plurality (e.g., four) of breakout assemblies to be mounted or secured thereon. This advantageously allows users to group and/or organize breakout assemblies 10 (or assemblies 110, or assemblies 210) into a versatile and space-saving modular arrangement (e.g., on mounting member 30). The mounting of assembly or assemblies 10 to mounting member 30 is quick and user-friendly, and adapts to many styles of physical support media.

Figure 11:
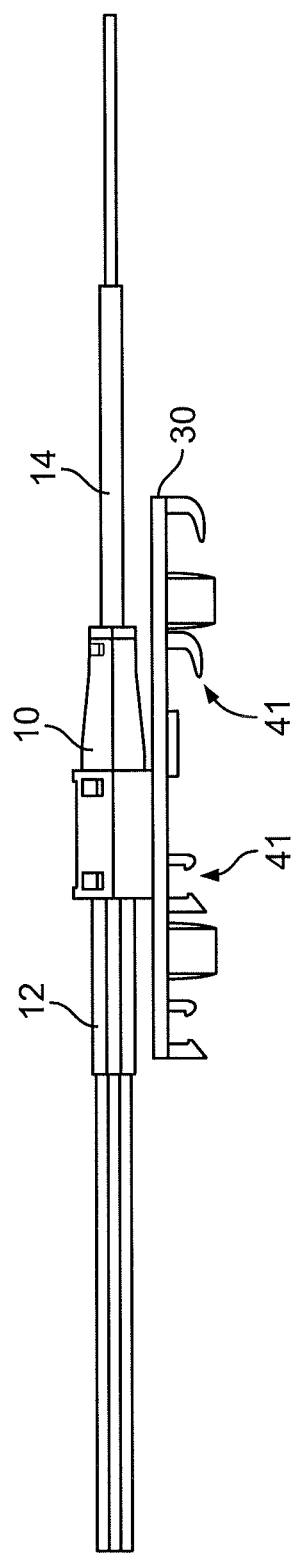
FIG. 11 is a side view of the mounting member of FIG. 9.
Figure 12:
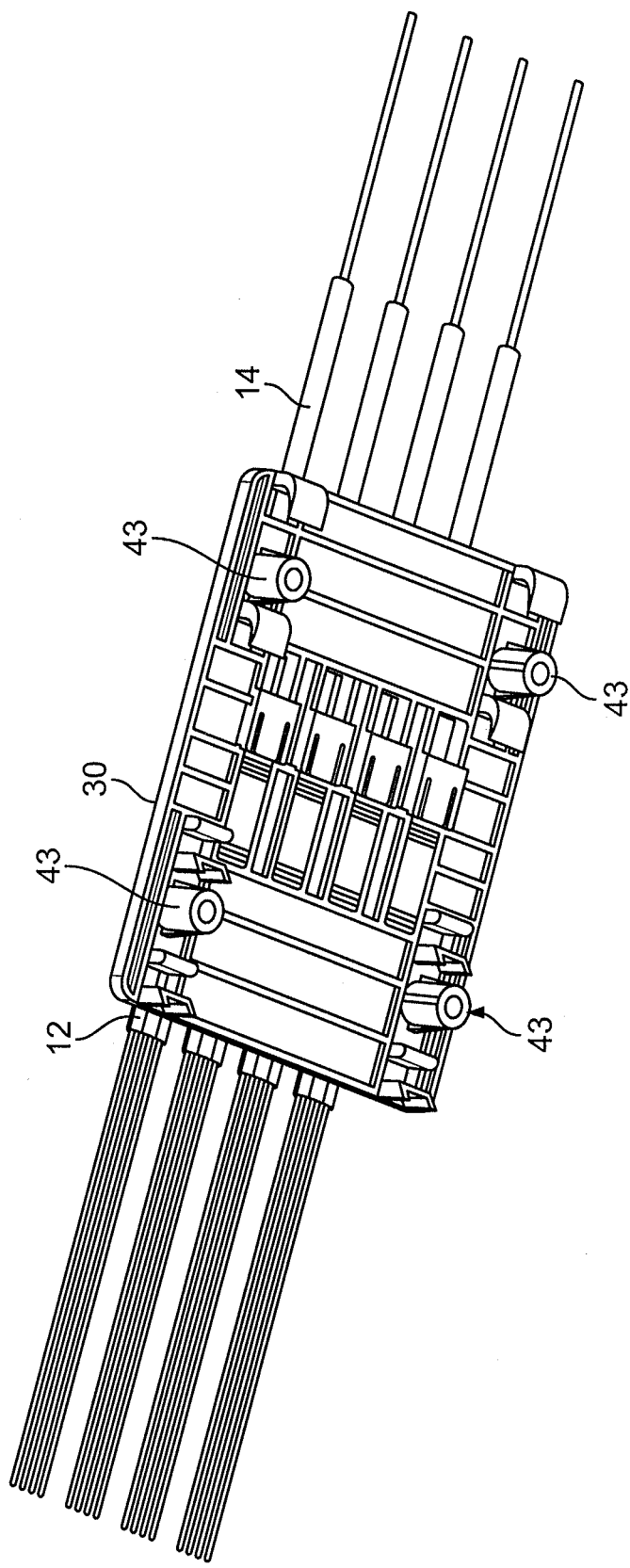
FIG. 12 is a bottom perspective view of the mounting member of FIG. 9.
Figure 13:
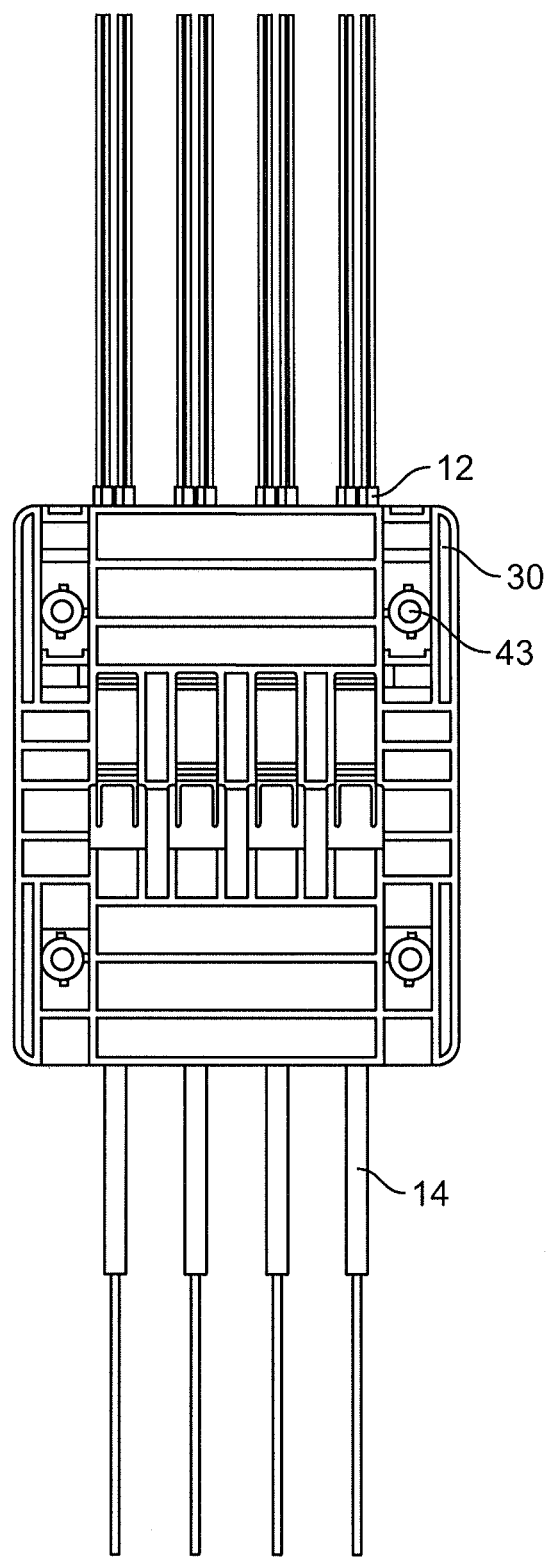
FIG. 13 is a bottom view of the mounting member of FIG. 9.

Once the breakout assembly (or assemblies) 10 is releasably secured or attached to the mounting member 30, a user may then mount or utilize the mounting member 30 with the breakout assembly 10 mounted thereon to any desired position and/or location (FIGS. 14-15). In exemplary embodiments and as depicted in FIG. 11, mounting member 30 typically includes at least one attachment member 41 that is configured and dimensioned to attach or mount with respect to various equipment and/or wires or the like. In general, mounting member 30 includes a plurality of attachments members 41, with the attachment members 41 configured to accommodate for the attachment to at least two wire pitches. For example, attachment members 41 may accept and/or snap to round wires or the like used in wire management equipment.

In exemplary embodiments and as shown in FIGS. 7-13, mounting member 30 typically includes at least one through hole component 43 that defines a through hole and is configured and dimensioned to allow the mounting member 30 to be mounted to a surface (e.g., to a substantially flat surface). In general, mounting member 30 includes a plurality of through hole components 43 (e.g., four), with the through hole components 43 configured to allow mounting member 30 to be hard mounted to a surface. For example, each through hole component 43 may be configured and adapted to be utilized in conjunction with threaded hardware or the like to allow mounting member 30 to be mounted to a surface. In an alternative embodiment, mounting member 30 may be mounted to a surface (e.g., to a substantially flat surface) via keyway mounting or the like.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A breakout assembly for use in fiber optic applications comprising:
    a clamshell housing having a first end and a second end, the clamshell housing including a mating member, the mating member including a post member and a securing member;
    wherein the housing is configured to house at least a portion of a fiber optic breakout region;
    wherein the post member extends from the housing and the securing member extends past at least one side of the post member to define the mating member;
    wherein at least a portion of the securing member is configured and dimensioned to be releasably secured to a mounting member, the mounting member including at least one attachment member: (i) extending from a bottom side of the mounting member, and (ii) adapted to releasably mount with respect to a plurality of physical support media applications that are characterized by differing mounting positions or locations;
    wherein a cable or harness containing a plurality of fiber optic cables or fibers extends from the first end of the housing; and
    wherein at least two fiber optic cables or fibers extend from the second end of the housing.

2. The assembly of claim 1, wherein the first end of the housing is configured and adapted to house at least a portion of the cable or harness containing the plurality of fiber optic cables or fibers; and
    wherein the second end is configured and adapted to house at least a portion of the at least two fiber optic cables or fibers.

3. The assembly of claim 2, wherein the cable or harness is a jacketed multiple fiber cable and the two fiber optic cables or fibers are jacketed single or multiple fiber cables.

4. The assembly of claim 2, wherein the second end is configured and adapted to house at least a portion of six fiber optic cables or fibers; and
    wherein the cable or harness is a jacketed twelve-fiber cable and the six fiber optic cables or fibers are jacketed two-fiber cables.

5. The assembly of claim 2, wherein the second end is configured and adapted to house at least a portion of twelve fiber optic cables or fibers; and
   wherein the cable or harness is a jacketed twelve-fiber cable and the twelve fiber optic cables or fibers are jacketed single-fiber cables.

6. The assembly of claim 2, wherein the cable or harness is a fiber optic cable harness that includes multiple cable segments secured in a bundle.

7. The assembly of claim 2, wherein the fiber optic breakout region is pre-molded before the housing is housed over the fiber optic breakout region.

8. The assembly of claim 7, wherein at least one material utilized during the pre-molding process bonds or secures strength members from each of the two fiber optic cables or fibers together at or near the breakout region to strength members of the cable or harness.

9. The assembly of claim 1, wherein the housing is defined by first and second housing structures; and
   wherein the first and second housing structures are latched with respect to each other to define the housing.

10. The assembly of claim 1, wherein the mating member is integrally formed from the housing.

11. The assembly of claim 1, wherein the mounting member includes at least one slot having a first portion wider than a second portion, the first portion configured and dimensioned to allow the securing member of the mating member to pass through the first portion of the slot; and
    wherein the second portion is configured and dimensioned to releasably secure the mating member to the mounting member after the housing has moved towards the second portion of the slot once the securing member of the mating member has passed through the first portion of the slot.

12. The assembly of claim 1, wherein the housing is molded or over-molded around or over at least a portion of a fiber optic breakout region.

13. The assembly of claim 1, wherein the housing is an overmolded housing.

14. The assembly of claim 1, wherein the mounting member with the releasably secured mating member is mounted with respect to or utilized in conjunction with equipment selected from the group consisting of a cable tray, vertical wire manager, rack mount enclosure, overhead cable pathway rack, floor box, multimedia workstation outlet, wall mount enclosure or cabinet, cabinet, rack and zero-U application.

15. The assembly of claim 1, wherein the mounting member includes a plurality of attachment members, the plurality of attachment members adapted to mount with respect to at least two different wire pitches.

16. The assembly of claim 1, wherein the mounting member includes at least one through hole component that defines a through hole and is configured and dimensioned to allow the mounting member to be mounted to a surface.

17. The assembly of claim 1, wherein the securing member extends past both sides of the post member to define a substantially T-shaped mating member.

18. The assembly of claim 1, wherein the securing member extends radially past the outer sides of the post member.

19. The assembly of claim 1, wherein the securing member extends past at least one side of the post member to define a substantially L-shaped mating member.

20. A method for attaching a breakout assembly to a mounting member comprising:
    providing a clamshell housing having a first end and a second end, the clamshell housing: (i) configured to house at least a portion of a fiber optic breakout region and (ii) including a mating member, the mating member including a post member and a securing member, with the post member extending from the housing and the securing member extending past at least one side of the post member to define the mating member; and
    releasably securing the mating member to a mounting member, the mounting member including at least one attachment member: (i) extending from a bottom side of the mounting member, and (ii) adapted to releasably mount with respect to a plurality of physical support media applications that are characterized by differing mounting positions or locations;
    wherein a cable or harness containing a plurality of fiber optic cables or fibers extends from the first end of the housing after the mating member is releasably secured to the mounting member; and
    wherein at least two fiber optic cables or fibers extend from the second end of the housing after the mating member is releasably secured to the mounting member.

21. The method of claim 20, wherein the first end of the housing is configured and adapted to house at least a portion of the cable or harness containing the plurality of fiber optic cables or fibers; and
    wherein the second end is configured and adapted to house at least a portion of the at least two fiber optic cables or fibers.

22. The method of claim 20, wherein the mounting member includes at least one slot having a first portion wider than a second portion, the first portion configured and dimensioned to allow the securing member of the mating member to pass through the first portion of the slot; and
    wherein the second portion is configured and dimensioned to releasably secure the mating member to the mounting member after the housing has moved towards the second portion of the slot once the securing member of the mating member has passed through the first portion of the slot.

23. In combination:
    a fiber optic breakout assembly that includes a clamshell housing having a first end and a second end, the clamshell housing: (i) configured to house at least a portion of a fiber optic breakout region and (ii) including a mating member, the mating member including a post member and a securing member, with the post member extending from the housing and the securing member extending past at least one side of the post member to define the mating member;
    a mounting member including: (i) at least one attachment member extending from a bottom side of the mounting member, and (ii) at least one slot having a first portion wider than a second portion, the first portion configured and dimensioned to allow the securing member of the mating member to pass through the first portion of the slot;
    wherein a cable or harness containing a plurality of fiber optic cables or fibers extends from the first end of the clamshell housing;
    wherein at least two fiber optic cables or fibers extend from the second end of the clamshell housing;
    wherein the second portion of the at least one slot of the mounting member is configured and dimensioned to releasably secure the mating member to the mounting member after the housing has moved towards the second portion of the slot once the securing member of the mating member has passed through the first portion of the slot; and wherein the at least one attachment member of the mounting member is adapted to releasably mount with respect to a plurality of physical support media applications that are characterized by differing mounting positions or locations.

\* \* \* \* \*